(12) United States Patent
Hastings

(10) Patent No.: US 11,265,347 B2
(45) Date of Patent: Mar. 1, 2022

(54) AUTOMATED TESTING OF NETWORK SECURITY POLICIES AGAINST A DESIRED SET OF SECURITY CONTROLS

(71) Applicant: Fortinet, Inc., Sunnyvale, CA (US)

(72) Inventor: Eric C. Hastings, Dripping Springs, TX (US)

(73) Assignee: Fortinet, Inc., Sunnyvale, CA (US)

( * ) Notice: Subject to any disclaimer, the term of this patent is extended or adjusted under 35 U.S.C. 154(b) by 186 days.

(21) Appl. No.: 15/707,566

(22) Filed: Sep. 18, 2017

(65) Prior Publication Data
US 2019/0089740 A1 Mar. 21, 2019

(51) Int. Cl.
*H04L 29/06* (2006.01)
*H04L 41/0893* (2022.01)
*H04L 41/0866* (2022.01)
*H04L 43/50* (2022.01)
*H04L 43/0817* (2022.01)

(52) U.S. Cl.
CPC .......... *H04L 63/20* (2013.01); *H04L 41/0866* (2013.01); *H04L 41/0893* (2013.01); *H04L 43/50* (2013.01); *H04L 63/0245* (2013.01); *H04L 63/0263* (2013.01); *H04L 43/0817* (2013.01); *H04L 63/14* (2013.01)

(58) Field of Classification Search
CPC . H04L 63/20; H04L 41/0866; H04L 41/0893; H04L 43/50; H04L 63/0245
USPC .......................................................... 726/1
See application file for complete search history.

(56) References Cited

U.S. PATENT DOCUMENTS

| 7,721,325 | B2* | 5/2010 | Lee | H04L 63/061 726/4 |
| 9,699,140 | B1* | 7/2017 | Jiang | H04L 61/3015 |
| 2005/0044419 | A1* | 2/2005 | Jones | H04L 29/12839 726/4 |
| 2006/0142004 | A1* | 6/2006 | He | H04W 48/16 455/434 |
| 2006/0274659 | A1* | 12/2006 | Ouderkirk | H04L 41/145 370/241 |
| 2007/0157286 | A1* | 7/2007 | Singh | H04L 41/0893 726/1 |
| 2008/0301765 | A1* | 12/2008 | Nicol | H04L 63/20 726/1 |

(Continued)

OTHER PUBLICATIONS

Shiravi, "Toward developing a systematic approach to generate benchmark datasets for intrusion detection", May 2012, elsevier, pp. 357-374 (Year: 2012).*

*Primary Examiner* — Taghi T Arani
*Assistant Examiner* — Gregory A Lane
(74) *Attorney, Agent, or Firm* — HDC Intellectual Property Law, LLP

(57) ABSTRACT

Systems and methods for automated testing of network security controls are provided. According to one embodiment, information regarding multiple desired security controls for a protected network are received by a network device. Network traffic configured to validate an extent of conformance by the protected network with the desired security controls is generated by the network device. The generated network traffic is transmitted by the network device onto the protected network. An assessment is performed by the network device regarding how network security policies configured within the protected network process the generated network traffic.

24 Claims, 13 Drawing Sheets

(56) References Cited

U.S. PATENT DOCUMENTS

| | | | |
|---|---|---|---|
| 2009/0276204 A1* | 11/2009 | Kumar | H04L 63/0227 |
| | | | 703/21 |
| 2010/0216462 A1* | 8/2010 | Aso | H04W 12/08 |
| | | | 455/434 |
| 2011/0055561 A1* | 3/2011 | Lai | H04L 9/083 |
| | | | 713/168 |
| 2013/0163412 A1* | 6/2013 | Hughes | H04W 40/04 |
| | | | 370/228 |
| 2014/0053248 A1* | 2/2014 | Hulusi | H04L 63/08 |
| | | | 726/4 |
| 2014/0331280 A1* | 11/2014 | Porras | H04L 63/20 |
| | | | 726/1 |
| 2017/0055302 A1* | 2/2017 | Wang | H04W 48/16 |

* cited by examiner

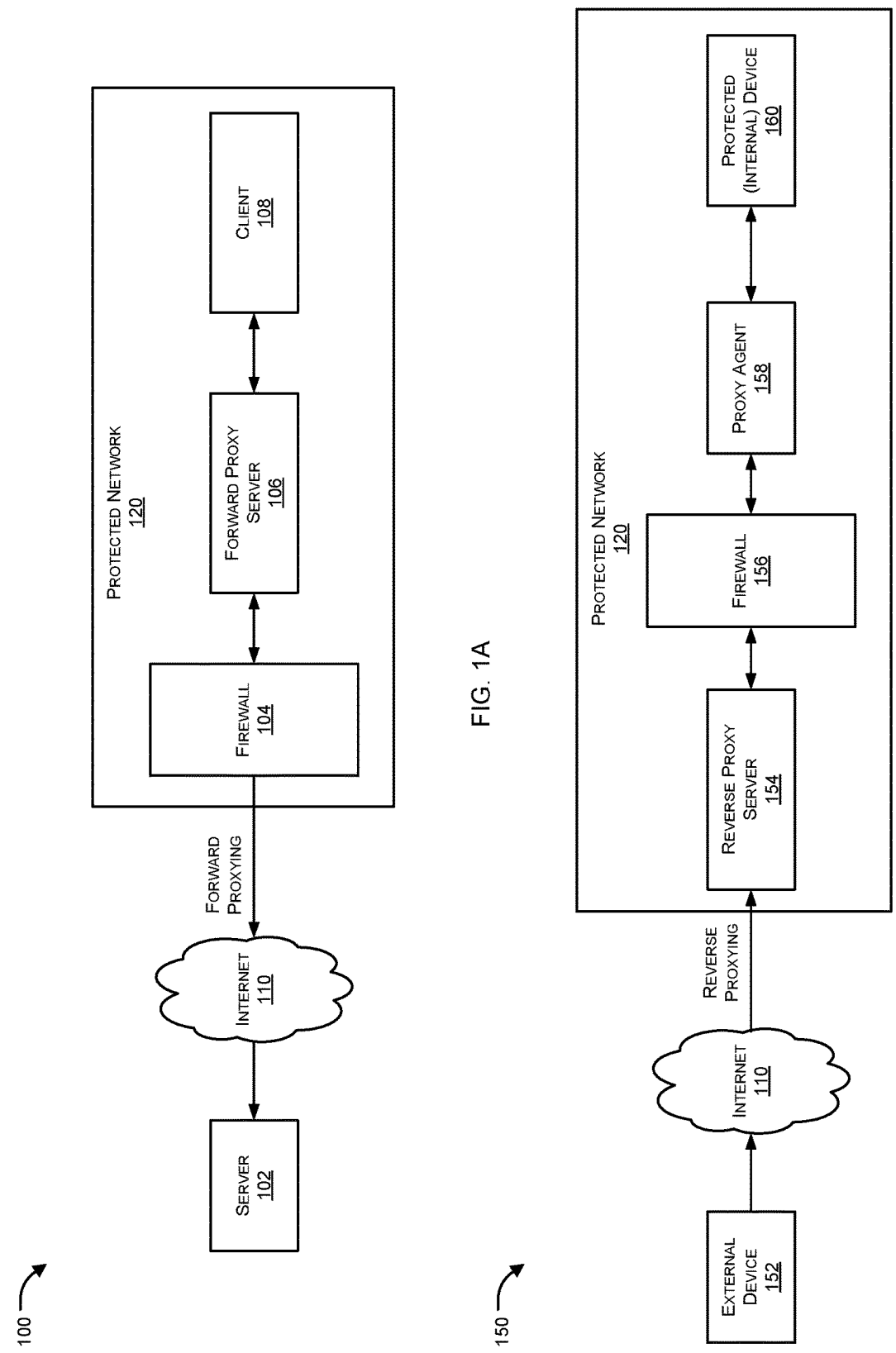

500

ASSESSMENT REPORT OF CONFIGURED NETWORK SECURITY POLICIES

✓ PORTS 2536 AND 2538 WERE OPEN
502

✓ APPLICATIONS abc.exe AND youtube.com WERE NOT BLOCKED
504

✓ PACKETS FROM SOURCE IP ADDRESS 192.168.232.YY WERE ALLOWED
506

✓ AV ENGINE ALSO BLOCKED PACKETS WITH THREAT LEVEL OF 2
508

✓ FIREWALL ALLOWED FILES LARGER THAN 5MB BETWEEN 12AM TO 6PM
510

✓ INTERNAL IP ADDRESS 192.168.322.458 CONTINUES TO SEND MALWARE PACKETS
512

FIG. 5

AUTOMATED TESTING OF NETWORK SECURITY POLICIES AGAINST A DESIRED SET OF SECURITY CONTROLS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright©2017, Fortinet, Inc.

BACKGROUND

Field

Embodiments of the present invention generally relate to network security. In particular, embodiments of the present invention relate to systems and methods for validating the accuracy and extent of compliance of configured security controls with respect to desired security controls.

Description of the Related Art

Network security systems may be utilized to enhance security and/or performance of a computing network, such as a private enterprise network. For example, a network security system may block or inspect traffic that is seeking resolution of a domain name, such as those suspected to be associated with malicious activity. Malicious activities can include distributed denial of service attacks or sending spam, for example, among others. With growing enterprises, network architectures and network security policies (also interchangeably referred to as security controls) are becoming extremely complex as they need to handle multiple client devices differently based on their attributes/functions/configurations, and also need to separately configure each network security device in a particular manner based on its parameters, operative expectations, and network characteristics.

In view of the complexity of network security policies, it is becoming increasingly more important to be able to assess whether such configured network security policies are actually meeting the expectations (which may also be referred to as desired security controls hereinafter) of the network administrator of the protected network, for instance. While network traffic generators/simulators are available for bandwidth testing and vulnerability scanners can provide a vulnerability assessment, there are no solutions that purport to offer the ability to audit a security policy that is currently in place to identify, for example, misconfigured, overly strict and/or overly generous security controls. There is therefore a need in the art for systems and methods that enable assessment of currently configured network security policies for a protected network and provide feedback with regard to how compliant such configured network security policies are in relation to desired security policies.

SUMMARY

Systems and methods are described for automated testing of network security controls. According to one embodiment, information regarding multiple desired security controls for a protected network are received by a network device. Network traffic configured to validate an extent of conformance by the protected network with the desired security controls is generated by the network device. The generated network traffic is transmitted by the network device onto the protected network. An assessment is performed by the network device regarding how network security policies configured within the protected network process the generated network traffic.

Other features of embodiments of the present disclosure will be apparent from accompanying drawings and from detailed description that follows.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIGS. 1A-C illustrate exemplary simplified network architectures in which or with which embodiments of the present invention can be implemented.

FIG. 5 illustrates an exemplary diagram showing representation of how assessment of network security policies configured for a protected network with respect to desired security controls can be represented in accordance with an embodiment of the present invention

DETAILED DESCRIPTION

Figure 1C:
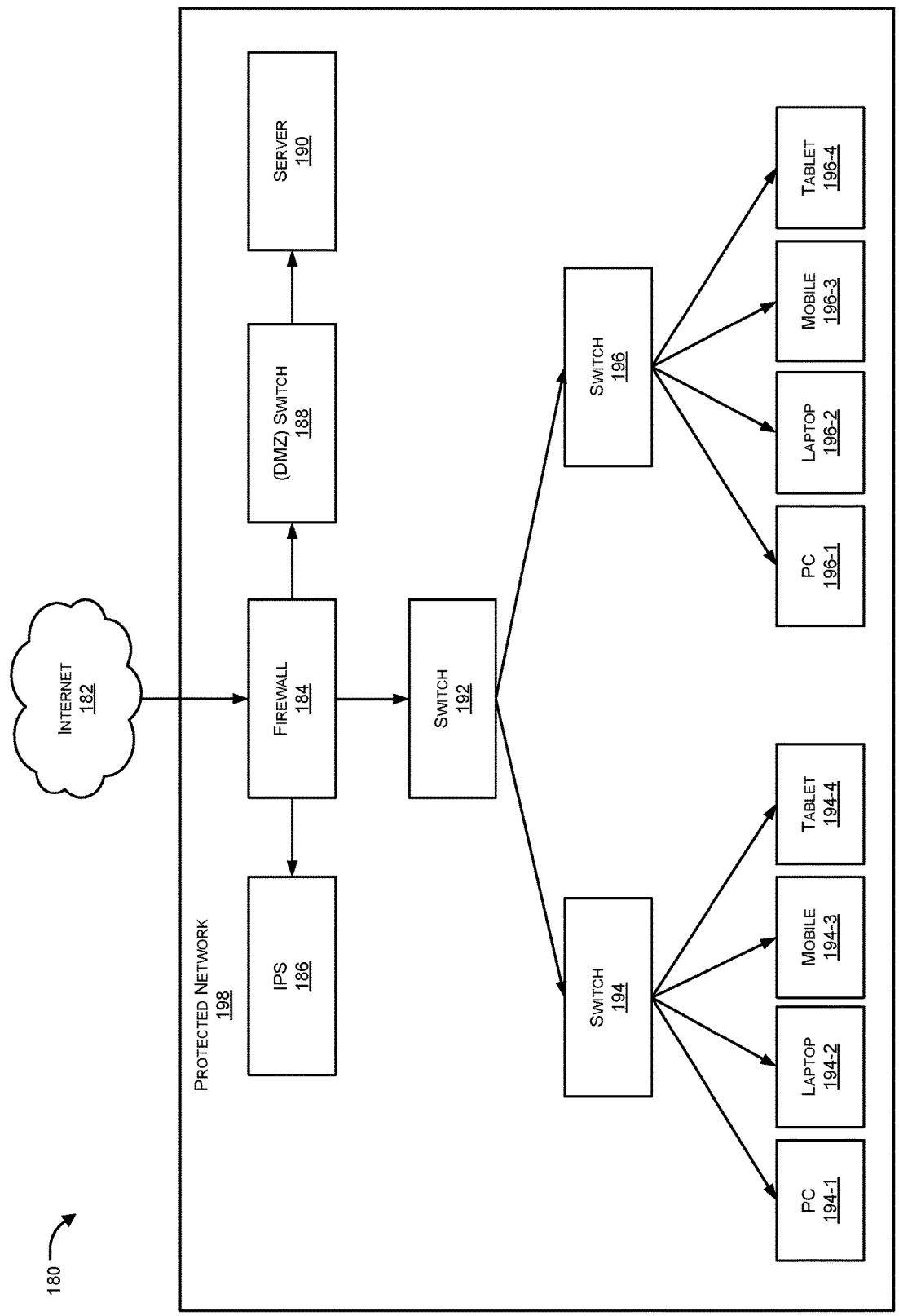

Systems and methods are described for automated testing of existing/already configured network security controls. Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

Systems and methods are described for automated testing of network security controls. Embodiments of the present invention relate to systems and methods for validating the accuracy and extent of compliance of configured security controls, representing a security policy of a protected network at issue, with respect to desired security controls (e.g., user account controls, access control, remote access control, antivirus and antimalware protection, application security, email security, endpoint security, behavioral analytics, firewall controls, IPS, mobile device security, network segmentation, security information and event management, virtual private networking (VPN), web security, wireless security, and data loss protection), representing desired behaviors and responses to various scenarios.

In an aspect, a method for automated testing of network security controls is disclosed wherein the method can include: receiving, by a network device, multiple desired security controls for a protected network; generating, by the network device, network traffic configured to validate an extent of conformance by the protected network with the desired security controls; transmitting, by the network device, the generated network traffic onto the protected network; and assessing, by the network device, how network security policies configured within the protected network process the generated network traffic.

In an aspect, the network device can be standalone network traffic generator or can be a network security device.

In another aspect, the method can further include the step of based on the assessment, suggesting, by the network device, at least one measure that can be taken within the protected network to improve conformance of the network security policies with the desired security controls, wherein, in an aspect, the at least one measure can include a suggested change to be made to the existing/configured network security policies.

In yet another aspect, the method can further include presenting, by the network device, an output indicating how the configured/existing network security policies processed the generated network traffic with respect to the desired security controls.

In an aspect, the generated network traffic can include any or a combination of simulated user traffic originated from multiple host/user subnets within the protected network, simulated traffic targeting multiple protected subnets within the protected network, and simulated application traffic.

In yet another aspect, the generated network traffic can include network traffic designed to test proper configuration of network security functions implemented within the protected network, wherein the network security functions can include any or more of firewalling, intrusion detection, antivirus scanning, content filtering, Uniform Resource Locator (URL) filtering and application control.

In an aspect, the method can further include finding, by the network device, open pathways within the protected network by performing port scanning.

In another aspect, the desired security controls can be indicative of or specify any or a combination of types of packets that should be allowed to pass through the protected network, applications that should be accessible to users of the protected network, categories of websites for which access from host subnets within the protected network should be blocked, internal resources of the protected network that should or should not be accessible by external users, one or more modes of access to one or more servers within the protected network from defined subnets within the protected network, and ports of one or more network devices within the protected network that should be blocked or open.

In an aspect, a device for automated testing of network security controls is disclosed, wherein the device can include a non-transitory storage device having embodied therein one or more routines operable to assess network security policies in place for a protected network; and one or more processors coupled to the non-transitory storage device and operable to execute the one or more routines, wherein the one or more routines can include: an administrative interface module, which when executed by the one or more processors, can receive information indicative of multiple desired security controls for the protected network; a network traffic generation module, which when executed by the one or more processors, can generate network traffic configured to validate an extent of conformance by the protected network with the desired security controls; a network traffic transmission module, which when executed by the one or more processors, can transmit the generated network traffic onto the protected network; and a network security policies assessment module, which when executed by the one or more processors, can perform an assessment regarding how the network security policies configured within the protected network process the generated network traffic.

In an aspect, the system of the present disclosure can be configured to test a suggested security policy for a network (e.g., a protected private enterprise network), and provide an assessment report to the system administrator. Such a system can be configured between an existing firewall and other components of a network, or can be configured within the firewall itself.

In another aspect, system of the present disclosure can evaluate existing network security policies by generating/ simulating network traffic designed to test them, and thereby perform an audit of the network security policies. In effect, the system of the present disclosure can act like an aggressor/bad client and/or an aggressor/bad server to check network security, find security holes, and make an assessment report for the system administrator. Various types of network security policies can be audited, and can include any or a combination of applications to be allowed/blocked, viruses to be checked for, files to be allowed/blocked for different user machines, requests to be allowed/disallowed for servers, etc. The system of the present disclosure can enable file executions in a Sandbox and can download and locally store latest virus signatures/test virus packages, e.g., the European Institute for Computer Antivirus Research (EICAR) standard anti-malware test file or the like for testing against them without resorting to repeated downloading.

In yet another aspect, the system of the present disclosure can be provided by an appropriate user interface through which the system administrator can configure desired security controls that are to be tested. As those skilled in the art will appreciate, the desired security controls can be in line with existing network security policies when the system administrator desires the system of the present disclosure to perform an audit to indicate how effectively the existing network security policies are being enforced by various components of the network.

In an aspect, the system of the present disclosure can be configured to test network security policies of multiple subnets, can be plugged into existing network security devices and can make appropriate changes to them to create new network security policies to conform them with the desired security controls. The system of the present disclosure can be configured as a standalone device at a user end, between users, between users and a server and between subnets etc. Multiple interfaces can be provided to the system of the present disclosure for simultaneous checking of multiple subnets. The system of the present disclosure can be configured as one or more Virtual Machines (VMs).

In an aspect, the system of the present disclosure can enable administrators to create new Active Directories or use existing Active Directories that can contain information about all network objects, e.g., users, servers, subnets etc., and rights and privileges granted to them to create desired security controls and check existing network security policies against them.

In an aspect, the system of the present disclosure can identify security controls that may be misconfigured, overly strict, or overly generous (lax) or any combination of these. The system can achieve this in an automated as well as manual manner and can serve as a proactive tool to find security lapses and user issues before they are even noticed and/or cause harm to the network, devices and data therein.

In another aspect, the system of the present disclosure can help administrators in creating network security controls that can be more comprehensive and well defined with lesser possibility of any ambiguity or uncertainties as to their effectiveness.

In an aspect, the system of the present disclosure can comprehensively test various components of a network including data sources, data destinations, routers and pathways etc. according to attributes of the network/device to be tested and desired security controls to pinpoint security holes before they become unmanageable and bring the whole network down. The proposed system can further be configured to test a network and its constituents for viruses, URL filtering, application control, etc.

In yet another aspect, the system of the present disclosure can deploy an automated process (that can be triggered by an event or a combination of events), or can be manually triggered to test various aspects of a network's security and defenses. Results of such a process can be reviewed and necessary changes can be made so as to make the network more secure in an environment that could be dynamically varying, for example, a new virus attack. These changes can be user configurable, or can be automatically made by the system of the present disclosure based on results of the process and the triggers it can generate, thus making for a fully automated "plug and play" system.

In an aspect, the system of the present disclosure can audit a security policy and further provide one or more inputs to system administrators to create a security policy that is as secure and comprehensive as possible by creating appropriate data traffic to test security controls that are part of one or more existing security policies in a controlled environment and a more automated fashion, thereby helping system administrators to put in place in a timely manner security policies that they have more confidence in.

In another aspect, the system of the present disclosure can present lapses/failures or deficiencies/shortcomings in existing security controls/policies with respect to a set of desired security controls and help establish whether a security fabric or an integrated product is needed. In this manner, the system can eliminate the need for manually combing through various rule sets (that configure various security policies), monitoring of network flows looking for issues and problems or running limited tools, for example, Nessus or Network Mapper (NMAP). In an aspect, the security fabric determined by the system can enable all the security devices in a protected network to work together and cooperatively remove various threats by monitoring devices and traffic, finding any gaps in disparate security products, follow and protect data, users and applications as they move across different computing devices for example personal computers (PCs), laptops, tablet computers, mobile devices, smart devices, Internet of Things (IoT) devices etc., intelligently segmenting the network and sharing global threat intelligence.

In yet another aspect, the system of the present disclosure enables administrators to obtain conclusive answers to various aspects pertaining to security of networks that they are managing. Such aspects can include, but are not limited to, applications that can be used by users and server subnets, categories of websites that the users can access, effectiveness of various filters, for example, URL filters deployed (e.g., are such filters effective all across the network and are they filtering all "bad" sites and traffic therefrom), categories of websites accessible to servers/critical assets, access to servers from various subnets, access by users to services and/or devices in the protected subnet exactly as desired (e.g., are they able to access services/devices not meant for them), configuration and working of Unified Threat Management (UTM) features as desired by system administrators, etc.

In an aspect, the system of the present disclosure can be configured with (or have access to) various desired security controls to generate appropriate network traffic, gather data and then report it to the system administrator. In an exemplary embodiment, the proposed system can source traffic from various host/user system subnets as it attempts to evaluate existing security policies and assess what internal and/or external resources it can successfully use or access.

In another exemplary embodiment, the proposed system can determine/find servers/protected subnets that the system administrator may have deemed critical, and use these servers/subnets as targets of tests from the user subnets.

In alternate exemplary embodiments, the system of the present disclosure can configure/define/determine any or a combination of applications and protocols that can/should be used to attempt to access server subnets (for example, various types of web browsers, standard protocols, e.g., File Transfer Protocol (FTP), Secure Shell (SSH), Server Message Block (SMB), Common Internet File System (CIFS), etc.), custom ports and custom protocols, open pathways that are available (e.g., those that the system of the present disclosure can identify using port scanning techniques), UTM features to test, Antivirus features to test (wherein the system can access safe but obfuscated viruses, for example), categories of sites or specific URLS to block from the host subnets, generic Intrusion Prevention System (IPS) signatures to use against the protected subnets, client based signatures that are in place from the Internet into the client subnets, applications that should be blocked (e.g., Peer-to-Peer (P2P) network services, etc.) to finally generate a comprehensive and actionable report regarding security of the network under test. The system can also be configured in a "plug and play" mode where it can use data generated to automatically configure new network security policies or amend existing ones to bring them into conformity with what the system administrator desires (as expressed by the set of desired security controls) or what the situation may require, thus enabling an unmonitored/unattended operation.

In an exemplary embodiment, the system of the present disclosure can be operatively connected to various subnets in a network, and can obtain, from a server (that can be in the cloud, for example), its configuration regarding what should be tested and parameters of the testing. Configured in such a manner, the system can use applications already on various users' machines (as well as test such applications) and also define Internet Protocol (IP) addresses from which and/or to which to direct test traffic or that it can use to obtain data/traffic for various tests to be performed.

In another aspect, the system of the present disclosure can be configured as a standalone device (or a standalone virtual machine appliance that can also be configured in a computing device/network) and can function like another piece of networking gear. It can be configured in such a manner in the network that it has access to various subnets (for example, like a core switch) using a tagged trunk port of one or more virtual local area networks (VLANs). If trunking VLAN is not possible, the system can be configured with multiple physical interfaces to enable the administrator to plug the testing interfaces into corresponding networks to test them simultaneously or separately.

In yet another aspect, various additional features can be added to the proposed system via plug-ins, applications, and upgrades etc. as required. In an exemplary embodiment, the system of the present disclosure can be incorporated in a separate device/appliance (integrated Virtual Machines, for example) that can be initialized and used as user machines. In such a configuration, a wide array of applications (for example, Internet browsers, pre-loaded P2P clients, network drive mapping, etc.) can be tested and deployed and new applications can be deployed through upgrades, thereby bringing additional applications and tests to the appliance.

In an aspect, the system of the present disclosure can contain various test virus packages (for example, those available from EICAR) that it can be configured to apply to protected subnets as part of an evaluation of security controls implemented thereby. The system can use a custom or modified Linux image to run various tests against target machines. For example, guidelines, methodologies and tools for testing web security, application security and performing vulnerability assessment are available from the Open Web Application Security Project (OWASP).

In another aspect, the system of the present disclosure can be adapted to incorporate multithreading-based scanning and/or testing procedures. Using multithreading, the system can source data traffic from multiple IP addresses in the host subnets at once. Traffic from every IP address in the subnet can then be tested to generate a complete picture, including, for example, identification of any "exceptions" in policy/security controls being tested where a single machine may have been inadvertently given greater access than desired.

In yet another aspect, the system of the present disclosure, or appliances created therefrom or using the same, can be integrated with existing network security devices deployed within a network to improve automation and depth of testing. In an exemplary embodiment, the system can be integrated with Advanced Threat Protection systems that are already deployed in a network so as to defend against sophisticated malware or hacking-based attacks targeting sensitive data. Various endpoint agents, network devices, email gateways, malware protection systems can be tested using a centralized management console to correlate alerts and manage defences.

In another exemplary embodiment, the system of the present disclosure can be integrated with existing security appliances of various vendors, wherein the system can download test files from the Internet and check the security appliances' queue/results to verify that the security controls/policies are configured appropriately (for example, a security control may be configured to check a file suspected to contain a virus by sending the file to a sandbox for inspection, and to immediately delete it if the suspected file is confirmed to contain the virus). In this manner, the system can identify gaps in antivirus profiles installed to ensure that all suspect files are being acted upon appropriately. The security appliance can be, for example, a dedicated network device connected upstream from a server to protect all servers on a public VLAN. Both the security appliance and the system of the present disclosure can be integrated via a graphical user interface (GUI) or a Command Line Interface (CLI). In yet another exemplary embodiment, the proposed system can automatically reconfigure the security controls/policies of a connected security device based on results of the security audit, or can provide an appropriate GUI through which a user of the system can easily reconfigure/add security controls of a security device based upon results of security audit(s) conducted.

In yet another exemplary embodiment, the system of the present disclosure can extract security profiles configured for a security device, and test such profiles automatically for any misconfiguration, gaps etc. The system can, for example, check the security profiles responsive to a change being made to any security profile, without the need to manually run various tests, and can further send alerts/reports to the administrator about any security issues found with the updated profiles. In an exemplary embodiment, the system can wait for a pre-determined time for the administrator to modify the updated security profile to bring them in line with security parameter(s) defined earlier, failing which the system can make such changes in the updated profile automatically. In this fashion, the system can provide an end-to-end security solution with no user intervention. Such automated testing can find varied applications, particularly in extremely high transactional and dynamic environments, for example, network environments used by the Payment Card Industry (PCI).

In an aspect, the system of the present disclosure can be configured to check various aspects of the network it is protecting including, but not limited to, identifying what ports/protocols are open/available between host subnets and protected subnets, identifying what applications can be used from host subnets to the protected subnets, identifying what UTM features are enabled and configured from the host subnets or protected subnets, whether the system administrator can download test virus packages (e.g., those available from EICAR) into the server subnet, identifying whether users can download viruses/browse banned (for example, adult) websites, whether users can use any P2P programs, whether users are capable of uploading any viruses or malwares to a server (and via the server into a protected subnet), whether a server is capable of access to disallowed sites, for example, adult websites, whether security policies allow certain devices in the network greater access than desired and whether all files being downloaded are properly being content scanned (e.g., checked for viruses, etc.).

FIGS. 1A-C illustrate exemplary network architectures in which or with which embodiments of the present invention can be implemented.

FIG. 1A illustrates a simplified network architecture 100 in which the system of the present disclosure can be configured as part of a protected network 120 that comprises several client devices (for example, client device 108 (which may also be interchangeably referred to as client(s) or computing device(s) hereinafter).

In an aspect, the system of the present disclosure can be implemented in protected network 120 that is configured to provide security to computing devices, for example, client device 108 that belongs to a common internal/protected network. Client device 108 can be operatively connected via a forward proxy server 106 and a firewall 104 to untrusted external entities (which may be unprotected and may expose client device 108 to malware etc.), such as server 102 that can be, for instance, an FTP server, a web server, an application server or the like.

In an aspect, any connection attempt made by client 108 to server 102 has to pass through proxy 106 first such that, depending on proxy 106 settings, the connection request may be allowed or denied. If allowed, the request can be forwarded to firewall 104 and then to server 102. From the point of view of server 102, it is proxy server 106 that issued the request and not client 108, and therefore when server 102 responds, it addresses its response to proxy server 106. Those skilled in the art will appreciate that network architecture 100 of FIG. 1A is merely exemplary and used as a simplified example to illustrate features/functionality of various embodiments of the present invention.

When proxy server 106 receives the response, it can recognize it as a response to the request that went through earlier and can forward the response back to client 108 that made the request. In this manner, proxy server 106 can keep track of requests, responses, their sources and their destinations, and different clients can send out various requests to different servers through proxy server 106, which can serve as an intermediary for all of them by allowing some requests while denying others. Proxy server 106 can accordingly serve as a single point of access and control, making it easier for a system administrator to enforce security policies.

As described herein, forward proxy server 106 can be used in tandem with firewall 104 to enhance an internal network's security by controlling traffic originating from clients in the internal network that are directed to hosts on the Internet (or other insecure networks). Forward proxy 106 is primarily aimed at enforcing security on client computers in an internal network.

In an aspect, the system of the present disclosure can be configured within proxy server 106, wherein the system can enable a user (for instance, a system administrator) to provide information indicative of desired security controls for protected network 120, and generate network traffic configured to evaluate the extent of conformance/nonconformance of actual security measures performed by protected network 120 with a set of desired security controls. Further, the system can transmit the generated network traffic onto protected network 120 and can perform an assessment regarding how the network security policies configured within protected network 120 process/respond to the generated network traffic. In this manner, the proposed system can perform auditing of network security policies as described herein.

As those skilled in the art will appreciate, besides client devices, an internal network to be protected can also include servers that to provide services to external clients operating in unprotected networks. For example, an FTP server of a company may be regularly asked to provide various files to field staff connected to the FTP server for latest inventory data, for example. Such field staff may use unprotected devices/networks to connect to the company's FTP server. In such a situation, a reverse proxy server may be deployed as described below with reference to FIG. 1B.

FIG. 1B illustrates a simplified network architecture 150 in which the proposed system of the present disclosure can be configured as part of a protected network 120 that comprises one or more server devices (for example, protected (internal) device 160).

In an aspect, the proposed system can be configured for protected networks employing reverse proxy servers. As illustrated in FIG. 1B, protected network 120 can include a reverse proxy server 154 connected via a firewall 156 to a proxy agent 158 that can be in operative communication with a protected device 160 that can be, for example, a server. Protected network 120 can communicate with external devices 152 using Internet 110. As those skilled in the art will appreciate, a reverse proxy does the opposite of what a forward proxy does. While a forward proxy proxies on behalf of clients (or requesting hosts), a reverse proxy proxies on behalf of servers by accepting requests from external clients on behalf of servers stationed behind it. Reverse proxy server 154 can provide a single point of access and control for servers within protected network 120, wherein proxy server 154 can work in tandem with firewall 156 to control traffic and requests directed to internal servers, such as protected device 160.

In an aspect, proxy agent 158 can be further configured in protected network 120 between internal device/server 160 and firewall 156, and can act as a stand-in for server 160, thus providing an additional level of protection. In an exemplary embodiment, a Dynamic Host Configuration Protocol (DHCP) proxy agent can act as a stand-in for an actual DHCP server, ensuring that it is invisible to clients (external devices). Because the clients can only see the proxy agent, they are unable to communicate directly with the DHCP server, lessening the possibility of an attack on the DHCP server and thereby increasing security of protected network 120.

In an aspect, the system of the present disclosure can be configured within reverse proxy server 154, and can enable a user (such as a system administrator of protected network 120) to provide information indicative of desired security controls for protected network 120 (e.g., the manner in which protected network 120 should or is intended to react with or respond to internal/external stimuli, such as threats/data/files/content/requests), and generate network traffic configured to validate the extent of conformance by protected network 120 with the desired security controls. Once generated, the proposed system can transmit the generated network traffic into protected network 120 and perform an assessment regarding how the pre-existing network security policies for protected network 120 process/respond to (e.g., block, allow, rate limit, load balance, log, alert, etc.) the generated network traffic. The responses by protected network 120 to the generated (test) network traffic can then be evaluated to determine the extent to which protected network 120 is in compliance with desired network policies or security controls. This, as a result, allows performance of (automated) auditing of network security policies as described herein.

Those skilled in the art will appreciate that both forward proxy server 106 and reverse proxy server 154 can be configured in the same device, thereby offering complete protection to servers as well as clients in protected network 120, besides performing automated auditing of all network security policies.

In an aspect, from the perspective of client/external device 152, it is reverse proxy server 154 that provides file transfer services, and device 152 is oblivious to the file transfer servers behind the proxy, which are actually providing those services. An Internet-based attacker would therefore find it considerably more difficult to acquire data found in those file transfer servers than if he wouldn't have had to deal with a reverse proxy.

In another aspect, reverse proxy servers can also act as load balancers for the servers behind them. Load balancers play a crucial role in providing high availability to network services that receive large volumes of requests such that when a reverse proxy performs load balancing, it distributes incoming requests to a cluster of servers, all providing the same kind of service. Therefore, for instance, a reverse proxy load balancing FTP services can have a cluster of FTP servers behind it.

As can be readily understood, both reverse and forward proxy servers relay requests and responses between source and destination machines. However, in the case of reverse proxy servers, client requests that go through them normally originate from the Internet, while, in the case of forward proxies, client requests normally originate from the internal network in which they reside.

FIG. 1C illustrates a simplified network architecture 180 in which the proposed system of the present disclosure can be configured as part of a protected network 198 that comprises servers as well as clients.

As illustrated, protected network 198 can include a firewall 184 operatively connected to an Intrusion Prevention System (IPS) 186 and a Demilitarized Zone (DMZ) switch 188. DMZ switch 188 can in turn be connected to a server 190, wherein firewall 184 can transfer incoming requests from unprotected devices outside protected network 198 to server 190 via DMZ switch 188, while outgoing requests from various computing device can be transferred using switches 192, 194, and 196, and firewall 184 to devices outside protected network 198 via the Internet 182.

In an aspect, DMZ switch 188 can enable only server 190 to be exposed to external (unprotected) devices outside protected network 198 by creating a physical or logical sub-network for this purpose. This can provide an additional layer of security to the protected network 198 as an external devices can access only what is exposed in the DMZ, while the rest of the network is firewalled.

In another aspect, the system of the present disclosure can be configured within firewall 184, and can enable a user (e.g., a system administrator of protected network 198) to provide information indicative of a set of desired security controls for protected network 198, and generate network traffic configured to validate the extent of conformance by protected network 198 with the desired security controls. Further, the system can transmit/direct the generated network traffic onto protected network 198 and can perform an assessment regarding how the network security policies configured within protected network 198 process the generated network traffic. The system can also plug into DMZ switch 188 and assess the security policies of DMZ switch 188 as well in a similar manner.

As can be readily understood, network traffic observed in protected network 198 can be generated by devices outside protected network 198 and be directed to server 190 based upon which server 190 can issue a response. Such network traffic can also be generated by devices internal to protected network 198, for example, PC 194-1, PC 196-1 (clients) etc., and directed to devices outside protected network 198, based upon which the outside devices can issue a response. Network traffic within protected network 198 can also be exchanged between clients and servers both residing within protected network 198. The system of the present disclosure can monitor all such traffic, as well as generate network traffic to emulate such traffic flows according to desired security controls provided by the system administrator.

Those skilled in the art will appreciate that the network configurations illustrated in FIGS. 1A-1C are not intended to be limiting, but rather are used herein to illustrate how aspects of the present invention can be implemented.

Figure 2:
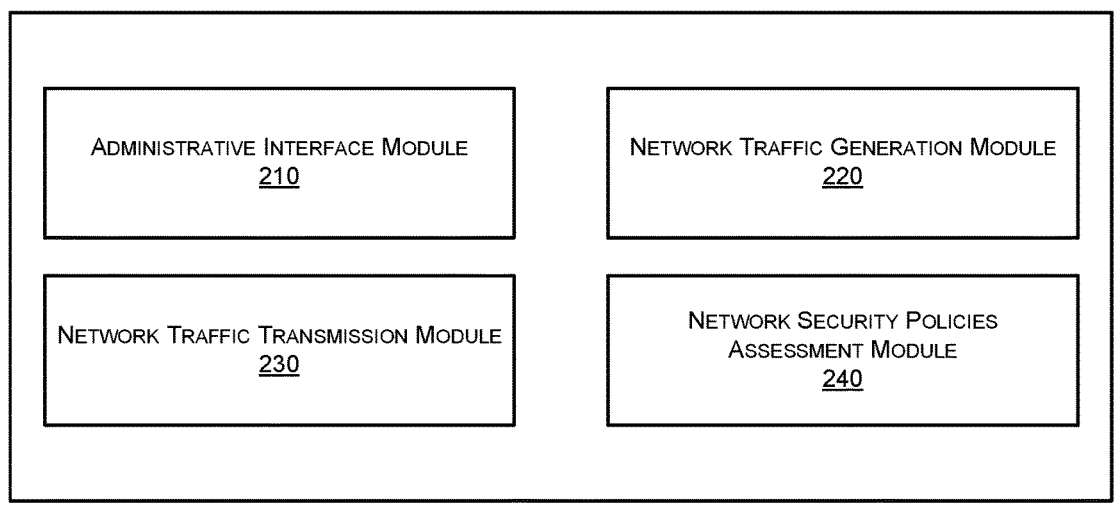
FIG. 2 illustrates an exemplary module diagram for assessing compliance of configured network security policies with desired security controls in accordance with an embodiment of the present invention.

FIG. 2 is a module diagram of a system 200 for assessing compliance of configured network security policies with desired security controls in accordance with an embodiment of the present invention. In an exemplary aspect, system 200 can include an administrative interface module 210, a network traffic generation module 220, a network traffic transmission module 230, and a network security policies assessment module 240.

Relevant modules of the proposed system being described herein can be configured to be operatively connected to an interface such as a web portal/page, or can be a part of a mobile application that can be downloaded on a mobile device that can connect to the Internet. In such a manner, the system can be available 24*7 to its users who can include system administrators or other authorized users.

It is to be appreciated that system of the present disclosure can be configured in a standalone network device or a Virtual Machine (VM) or can be configured in any or a combination of a gateway device, a firewall device, an intrusion prevention system (IPS), an intrusion detection system (IDS), a hybrid IDS (HIDS), a network IDS (NIDS), a Unified Threat Management (UTM) device or other network security device. Also, modules explained with reference to FIG. 2 are completely exemplary and logical, and, therefore actual implementations may be configured as part of additional modules, or sub-modules of these modules, or any other combination of explained modules so as to achieve the intended functionality.

In an aspect, administrative interface module 210 can be configured to or enabled to receive information indicative of desired security controls for a protected network at issue. Such information can be received in a variety of forms such as through a checklist of preferred security controls for the protected network, in the form of network access control lists (ACLs), IPS rules/signatures and corresponding actions, in the form of a security rules database and/or in text format explaining how an enterprise would like the protected network to respond to different types of network traffic scenarios, including, but not limited to protocols, interfaces, applications, requests, data, files, and queries. Module 210 can be configured with appropriate user interfaces to enable an authorized user (such as a system administrator) to provide information indicative of the desired security controls for the protected network or information indicative of where such information by be accessed. In an aspect, such desired security controls can include or pertain to any or a combination of blocking/allowing certain applications, blocking/allowing files of pre-determined file formats and/or below/above pre-determined size, blocking/allowing data packets from pre-determined IP addresses/subnets or URLs, source-destination attributes, ports to be closed, ports to be opened, blocking websites, allowing websites, blocking adult content on internet on basis of pre-determined keywords, firewall configuration, allowing only media files legally purchased/downloaded and with appropriate Digital Rights Management (DRM) schemas to be played, allowing only some servers/user machines to access certain websites while blocking others, configuring anti-virus engines with appropriate properties as can be done by providing different virus signatures to it, defining actions, for example, sandboxing or deletion or alert based upon detection of pre-determined viruses/malwares, attributes of intrusion detection systems, attributes of intrusion prevention systems, etc.

As can be appreciated, desired security controls can be widely configured by the system administrator depending on network characteristics as well as requirements at any time. For example, when a new exploit is identified that takes advantage of a security hole (a vulnerability) in an application, operating system, network service or protocol, the system administrator can use the system to configure a desired security control that checks the network for machines that have the application or operating system installed or offer the network service or are accessible via the protocol so as to generate a report identifying machines that have exposure as a result of the exploit, as explained further below.

In an aspect, module 210 can be operatively configured via a mobile application that the system administrator can download on his/her mobile device. In yet another aspect, user interface of module 210 can be provided in the form of a browser-based interface or via a webpage portal that an authorised user can access to set/define/select desired security controls. Such desired security controls can also be initially proposed by the instant system/module 210, and then filtered/reviewed by the system administrator/user so as to confirm the final desired set of security controls that the user would like to be implemented for the protected network. For example, a set of industry standard security controls or best practices can be used as a baseline.

Module 210 can continuously monitor incoming and outgoing data traffic of a network, and can automatically configure one or more desired security controls if pre-determined thresholds set by the system administrator are exceeded. For example, module 210 can monitor incoming multimedia traffic and can determine that number of multimedia files above 100 MB has shown a sharp spurt (say, 100%) over the past one hour. Module 210 can automatically configure a desired security control to identify machines that can download multimedia files above 100 MB and the system of the present disclosure can generate an assessment report for the system administrator pinpointing such machines, as described further. The system administrator can accordingly be alerted appropriately.

In an aspect, administrative module 210 can provide information indicative of the desired security controls for the protected network as described above to a network traffic generation module 220. In an alternate embodiment, administrative module 210 can be configured within the network traffic generation module 220.

In an aspect, network traffic generation module 220 can receive, from module 210, information indicative of desired security controls for a protected network and, based on this information, can generate network traffic configured to validate the extent of conformance by the protected network with the desired security controls.

In an instance, if one of the desired security controls is to not allow receipt of .mp3 files greater than 20 MB by a protected network subnet, module 220 can generate a test .mp3 file of 21 MB and pass it to a network transmission module 230 described further below. In another instance, in case another desired security control may be to not allow execution of a particular type of application (e.g., P2P file sharing applications) or a specific application (e.g., KaZaA, Gnutella or LimeWire) by a group of users or by clients on a particular subnet, module 220 can generate traffic simulating the prohibited behavior and pass it to module 230. In a similar manner, module 220 can generate appropriate network traffic as per the desired security controls and pass the traffic to network traffic transmission module 230.

In an aspect, network traffic transmission module 230 can receive generated network traffic from module 220, and transmit/inject the generated network traffic into the protected network in accordance with the attributes of the generated network traffic (e.g., from an internal client on a particular subnet, from a user account configured in a particular manner or from an external source) and desired security controls that caused its generation.

In an instance, when a desired security control is to not allow receipt of a .mp3 file greater than 20 MB by a protected subnet, module 230 can receive a test .mp3 file of 21 MB that can be generated by module 220 and transmit/inject the generated test file into the protected subnet. Those skilled in the art will appreciate that traffic being generated may not only be for negative scenarios, i.e., test traffic intended to identify lapses in security, but can also be generated for testing whether the protected network is actually properly allowing and processing packets/files/requests that it should be. In this manner, conformance with desired security controls can be tested from all perspectives.

Module 230 can therefore receive network traffic generated by module 220 as per the desired security controls, and can pass on the generated network traffic to appropriate subnets, user machines etc. as per attributes associated with the generated network traffic. Timing of such traffic injection, frequency/volume thereof, among other traffic parameters/attributes can also therefore be controlled/configured to test compliance for all scenarios.

In an aspect, network security policies assessment module 240 can be configured to perform an assessment of how the network security policies already configured within the protected network handled the generated network traffic. Module 240 can generate an assessment report consequent to assessment as above, wherein such an assessment report can be provided to the system administrator by any appropriate means. For example, it can be displayed on the system administrator's computing device, or can be mailed to system administrator's email address.

In yet another aspect, module 240 can provide assessment report data to other systems (that can be configured within the system of the present disclosure as well), which can use the data to reconfigure the existing/already configured network security policies of the protected network to align them as closely as possible to the desired security controls. In this manner, a "self-correcting" network can be achieved, wherein the network continuously monitors itself and keeps on aligning the network security policies to the desired security controls as set by the system administrator.

Figure 3A:
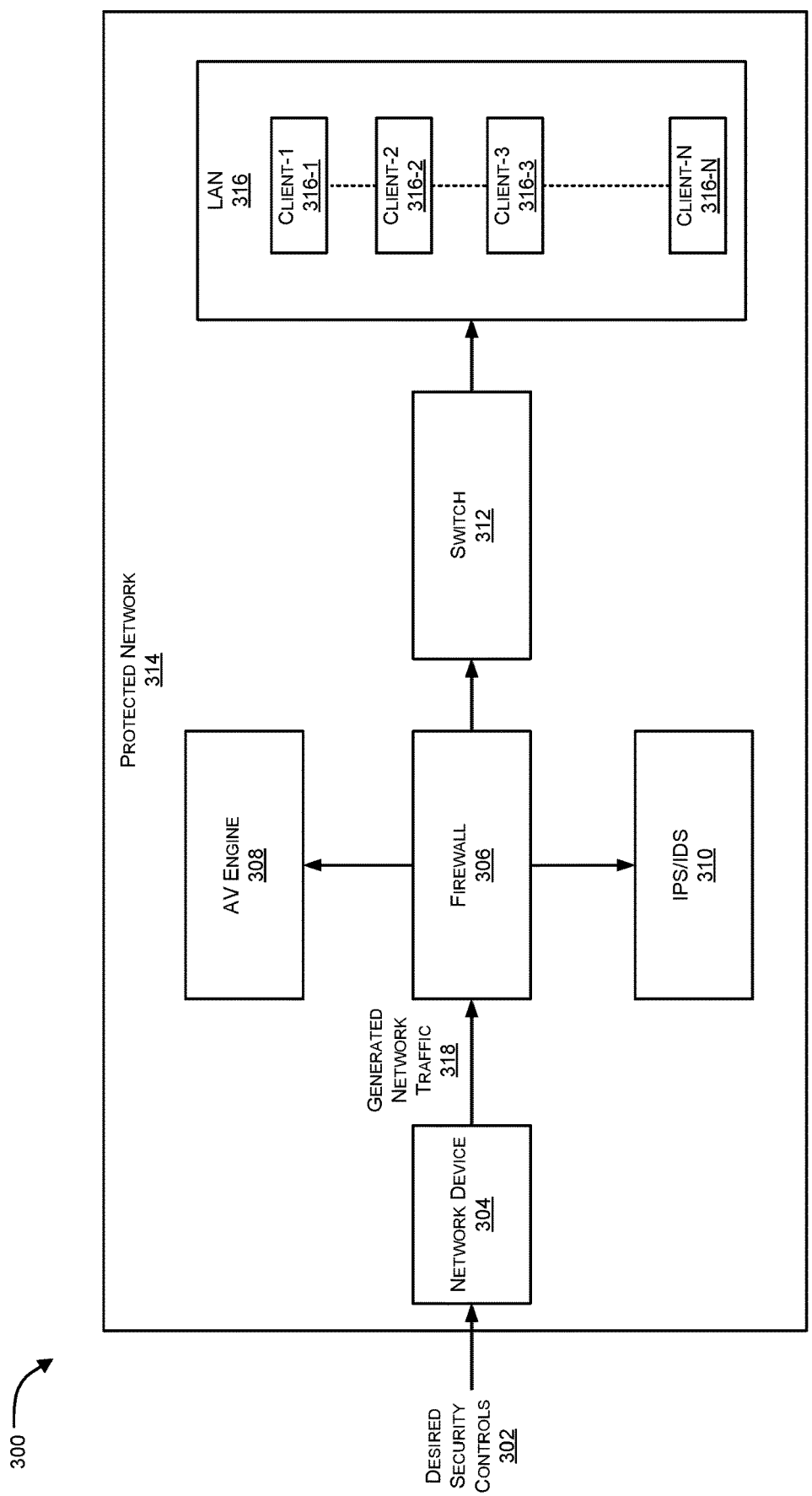
FIGS. 3A and 3B illustrate exemplary diagrams showing how a network device can assess compliance of network security policies configured for a protected network with desired security controls in accordance with an embodiment of the present invention.
Figure 3B:
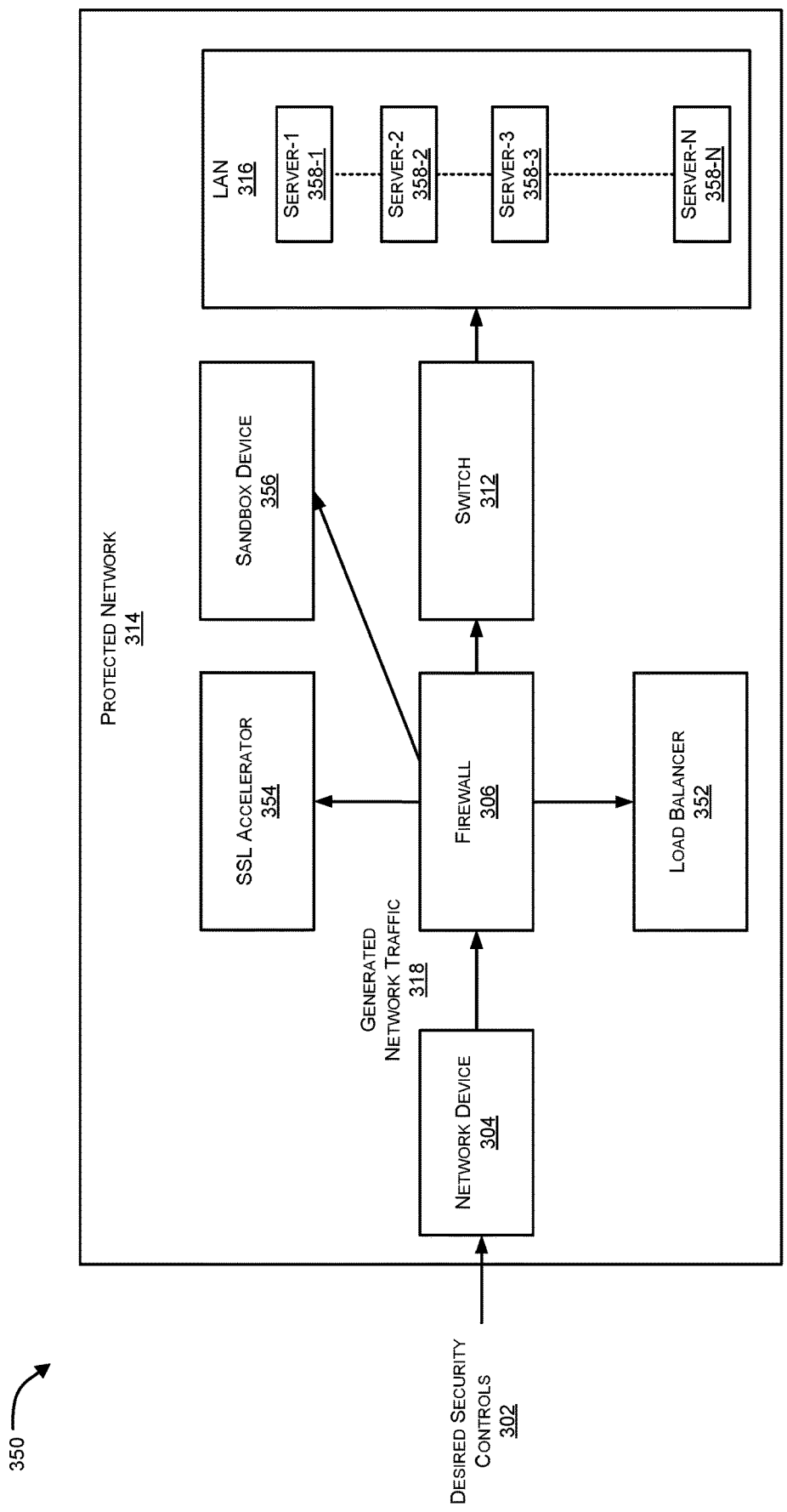

FIGS. 3A and 3B illustrate exemplary diagrams showing how a network device can assess compliance of network security policies configured for a protected network with desired security controls in accordance with an embodiment of the present invention. As illustrated in FIG. 3A, the proposed system can be configured in a standalone networking device, for example, in a network device 304 that can be configured within a protected network 314. Network device 304 can be interfaced with protected network 314 though a firewall 306, which in turn can be operatively connected to an AV Engine 308 and an IPS/IDS (Intrusion Prevention System/Intrusion Detection System) 310. Network traffic, after being processed by these components as required, can be received by a switch 312 (that can be a network router, for example) and further directed to appropriate client devices shown as client-1 316-1, client-2 316-2, . . . , and client-N 316-N, the devices being part of a local area network (LAN) 316.

In an aspect, network device 304 can receive desired security controls 302, can generate network traffic 318 in accordance with the desired security controls 302, and can direct/inject packets of the generated network traffic 318 as appropriate to various components of protected network 314 (or cause other network devices to generate and emit such traffic). For example, a test network traffic generated in accordance with a desired security control to check/test whether firewall 306 allows a particular type of traffic (e.g., a multimedia file of 20 MB) to pass can be directed toward firewall 306, with its end point being client-316-3. In a similar manner, similar test network traffic generated in accordance with a desired security control to check/test whether AV engine 308 can protect against a pre-determined virus/exploit can be directed towards AV engine 308 for its processing therein. Another set of test network traffic can be generated in accordance with a desired security control to check/test whether a certain categories of websites are blocked can be directed through firewall 306 from a client system subnet (e.g., LAN 316). Yet another set of test network traffic generated in accordance with a desired security control to check/test whether client-1 316-1 can run a particular application (say, Skype) can be simulated as originating from client 1 316-1.

In another aspect, network device 304 can monitor propagation/execution of the generated test network traffic as appropriate to determine whether existing network security policies are in-line with the desired security controls or need changing, and generate an assessment report accordingly for the system administrator. For instance, network device 304 can test whether firewall 306 allows a multimedia file of 20 MB to pass and generate an assessment report accordingly, or can test whether AV engine 308 can protect against a pre-determined virus and generate an assessment report accordingly, or can test whether firewall 306 can block a certain website and generate an assessment report accordingly, or can test whether client-1 316-1 can run an application (say Skype) and generate an assessment report accordingly.

In this manner, network device 304 can check various parts, components, ports, potential security holes, and behavior of the protected network against the desired security controls and can generate an assessment report accordingly. Such assessment report can highlight variances between existing (already configured) network security policies and the desired security controls, and also how the gap can be fulfilled i.e. what steps need to be taken by administrator of the protected network to make the network compliant with desired security controls/policies. In this manner, the proposed system as configured in network device 304 can perform a comprehensive automated audit of existing network security policies.

FIG. 3B illustrates another exemplary diagram showing how a network device 304 can assess compliance of network security policies configured for a protected network 314 with desired security controls in accordance with an embodiment of the present invention. As illustrated in FIG. 3B, the proposed system can be configured within a standalone network device, for example, in a network device 304 that can be configured within protected network 314. Network device 304 can be interfaced with protected network 314 though a firewall 306, which can in turn be operatively connected to a load balancer 352, a Secure Sockets Layer (SSL) accelerator 354, and a sandbox device 356. Network traffic, after being processed by these components as required can be received by a switch 312 (that can be a network router, for example) and further directed to appropriate computing machines shown as server-1 358-1, server 2358-2, . . . , and server N 358-N, the machines being part of a local area network (LAN) 316.

In an aspect, network device 304 can be operatively connected with load balancer 352 via firewall 306, wherein load balancer 352 can serve to improve the distribution of computing workloads across multiple computing resources as provided by servers in LAN 316. Protected network 314 may be the one receiving various computing requests from one or more external entities. For example, protected network 314 can be configured as a server farm, for example, a search engine or other network service that can receive various search queries, for which one or more servers 316-1 and 316-2 can respond with results of such search queries. Load balancing can optimize resource use, maximize throughput, minimize response time, avoid overload of any single resource and can increase reliability and availability through redundancy. The scheduling algorithm used by the load balancer 352 can be simple (for example, random choice or round robin) or can be more sophisticated, taking into consideration factors like a server's reported load, least response times, up/down status (that can be determined by a monitoring poll, number of active connections, geographic location, capabilities, or how much traffic it has recently been assigned).

In an aspect, network device 304 can configure a desired security control to monitor effectiveness of load balancer 352, and can generate network traffic 318 accordingly. Further, network device 304 can monitor load balancing of network traffic 318 being performed by load balancer 352 as per existing network policies, and can generate an assessment report that can highlight variances between existing network security policies and the desired security control. In an exemplary embodiment, the proposed system can simulate a Distributed Denial of Service (DDoS) attack, generate data traffic accordingly, monitor load balancer 352 and generate an assessment report that can enable the system administrator to configure load balancer 352 to operate more effectively.

In another exemplary scenarios, protected network 314 may include a web server receiving encrypted traffic being sent using security technology, e.g., Secure Sockets Layer (SSL), for establishing encrypted links between clients and servers. For example, protected network 314 can serve as a payment processing gateway. Load balancer 352 can relieve protected network 314 of the processing burden of encrypting and/or decrypting such traffic by offloading such processing to SSL accelerator 354 that can be designed specifically to perform SSL acceleration or SSL termination. In an exemplary embodiment, SSL accelerator 354 can be configured as a separate card that can plug into a PCI slot of a computer that contains one or more co-processors able to handle much of the SSL processing.

In an aspect, network device 304 can configure a desired security control to measure the effectiveness of SSL Accelerator 354 and can generate encrypted/decrypted traffic 318 accordingly. Further, network device 304 can monitor decryption/encryption of traffic 318 as per existing network policies and can generate an assessment report that can highlight the variances between existing network security policies and the desired security control.

In yet another exemplary embodiment, protected network 314 can have a sandbox device 356 operatively configured via firewall 306 with the system of the present disclosure embodied as network device 304. Network device 304 can configure a desired security control that requires execution of pre-determined format of files in sandbox 356 and can generate network traffic 318 accordingly. Further, network device 304 can monitor execution of files in the sandbox 356 as per existing network policies and can generate an assessment report that can highlight the variances between existing network security policies and the desired security control.

In this manner, as described above, system of the present disclosure can determine desired security controls as required for a protected network, generate traffic accordingly and direct it to the protected network, and generate an assessment report that can highlight variances between existing network security policies and the desired security controls based on how the protected network processes the generated traffic.

While the system of the present disclosure has been embodied above as standalone hardware 304, it can be as well deployed as one or more virtual machines (VMs), or can be integrated within an existing network security appliance. The system of the present disclosure can also be configured as part of an endpoint protection suite wherein it can monitor endpoints, e.g., client machines, and scan network traffic to provide timely assessment reports as required. User interfaces of the proposed system can be well integrated with existing interfaces of a protection suite so as to enable a system administrator to monitor all network traffic and its desired parameters from a centralized console/dashboard.

Figure 4:
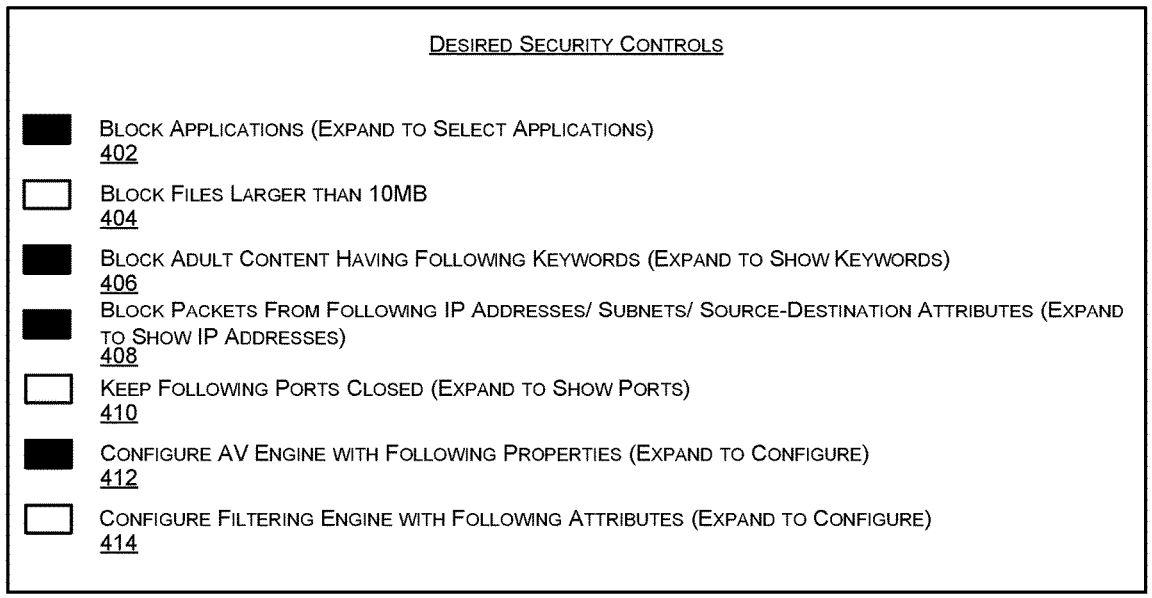
FIG. 4 illustrates an exemplary diagram of how desired security controls can be selected and configured in accordance with an embodiment of the present invention.

FIG. 4 illustrates an exemplary diagram illustrating how desired security controls can be selected and configured in accordance with an embodiment of the present invention.

In an aspect, the system of the present disclosure can have a user interface that can be accessed by a user (a system administrator, for example) using which the user can configure desired security controls based on which the proposed system can generate network traffic to test how compliant existing network policies/security controls are and how different network elements, such as clients, servers and security devices react to injected test traffic.

In another aspect, through interface of the present system, an administrator can select one or a combination of security controls, for example block applications (402), block files larger than LOMB (404), block adult content having pre-determined keywords (406), block packets from pre-determined IP addresses/subnets, source-destination attributes (408), ports to be closed (410), configure AV (anti-virus) engine with appropriate properties (412), and configure filtering engine with appropriate properties (414). Any other security control can be configured as may be desired for a protected network.

Those skilled in the art will appreciate that the interface described with reference to FIG. 4 is purely exemplary and not intended to be limiting.

Based on the desired security controls, the system of the present disclosure can generate traffic and further inject the generated traffic into a protected network it is configured in/with so as to test/audit the network and its various components against the generated traffic, and accordingly assess the existing network security policies with respect to desired security controls.

FIG. 5 illustrates an exemplary diagram showing representation of how assessment of network security policies configured for a protected network with respect to desired security controls can be represented in accordance with an embodiment of the present invention. As described above, based on desired security controls (as configured, for example, using the user interface described with reference to FIG. 4), the system of the present disclosure can generate traffic and further inject the generated traffic into the network under test from appropriate sources. Accordingly, the system can test/audit the network and its various components against the generated traffic and assess the existing network security policies with respect to desired security controls.

In an aspect, the system of the present disclosure can generate an assessment report of presently configured network security policies audited using traffic generated according to the desired security controls and highlight the gaps between the existing network security policies and the desired ones.

As illustrated in FIG. 5, in an exemplary embodiment, the assessment report can indicate that ports 2536 and 2538 were open (502), applications abc.exe and youtube.com were not blocked (504), packets from source IP address 192.168.232.YY were allowed (506), AV engine also blocked packets with threat level of 2 (508), firewall allowed files larger than 5 MB between 12 AM to 6 PM (510), and internal IP address 192.168.332.458 continues to send malware (512).

It can be readily appreciated that the assessment report illustrated in FIG. 5 is completely exemplary, and would be generated based on desired security controls as set in FIG. 4, for example, and the already configured security controls. For example, if a desired security control has been set to not check an internal IP address for malware packets, such an IP address will be excluded from such checks. In another exemplary embodiment, system of the present disclosure can have a desired security control to block adult content with pre-defined keywords, can generate traffic having those keywords, and can generate an assessment report showing traffic with which keywords was blocked and which was not. URLs/websites that generated such traffic can also be indicated in the assessment report.

In an aspect, system of the present disclosure can automatically re-configure/re-align existing network policies based on desired security controls/policies and can indicate such changes in the assessment report. For example, if a desired control requires traffic with certain keywords to be blocked, system of the present disclosure can automatically re-configure existing security controls such that they start blocking websites generating such traffic. Such automatic modifications may also be indicated in the generated assessment report. Alternatively, based on difference in outcome between current and desired security controls, it is also possible for the system to indicate what actions should be taken by the administrator so as to enable the protected network to have the desired security controls.

Figure 6:
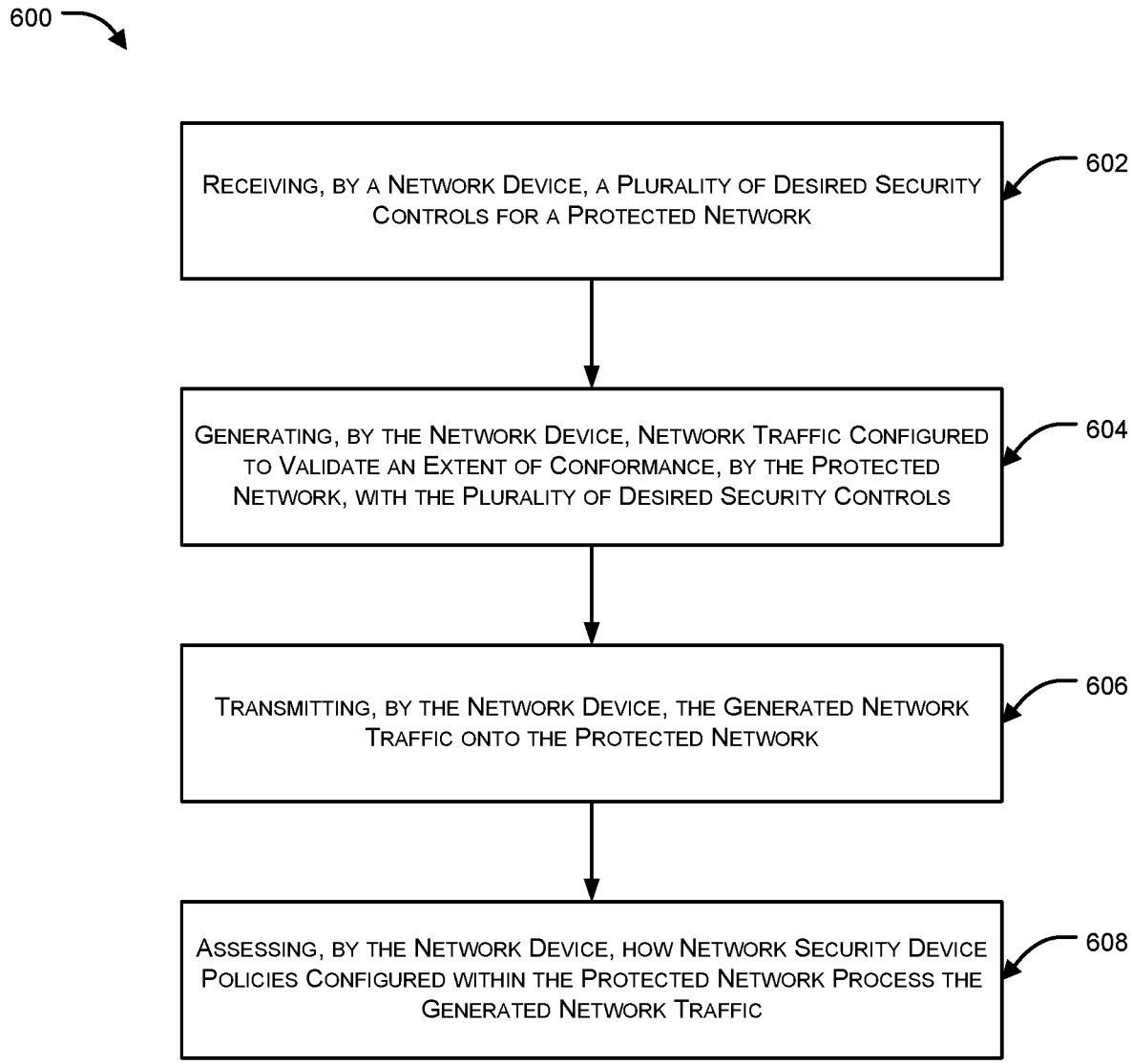
FIG. 6 is a flow diagram illustrating a process for assessing compliance of configured network security policies with desired security controls for a protected network in accordance with an embodiment of the present invention.

FIG. 6 illustrates a flow diagram 600 for assessing compliance of configured network security policies with desired security controls for a protected network in accordance with an embodiment of the present invention In an aspect, a method of assessing compliance of configured network security policies with desired security controls for a protected network can include, at step 602, receiving, by a network security device, information regarding multiple desired security controls for a protected network under test. The method can further include, at step 604, generating, by the network device, network traffic configured to validate an extent of conformance by the protected network with the desired security controls.

In an exemplary embodiment, the system of the present disclosure can be configured as several virtual machines that can be initialized and used as test user machines so as to allow testing of different sets of privileges. In an exemplary embodiment, one virtual machine can be configured as a client that cannot request any file above 100 MB to be downloaded, while another can be configured as a server that rejects any request for a non DRM (Digital Right Management) encoded media file. The desired security controls can be set accordingly and network traffic can be generated to check whether the virtual test user machines actually are in compliance with the desired security controls.

The method of the present disclosure can further include, at step 606, transmitting, by the network device, the generated network traffic onto the protected network. Those skilled in the art will appreciate that the generated traffic can be injected into the protected network from various internal or external sources. The method of the present disclosure can further include, at step 608, assessing, by the network device, how network security policies configured within the protected network handled the generated network traffic.

Figure 7A:
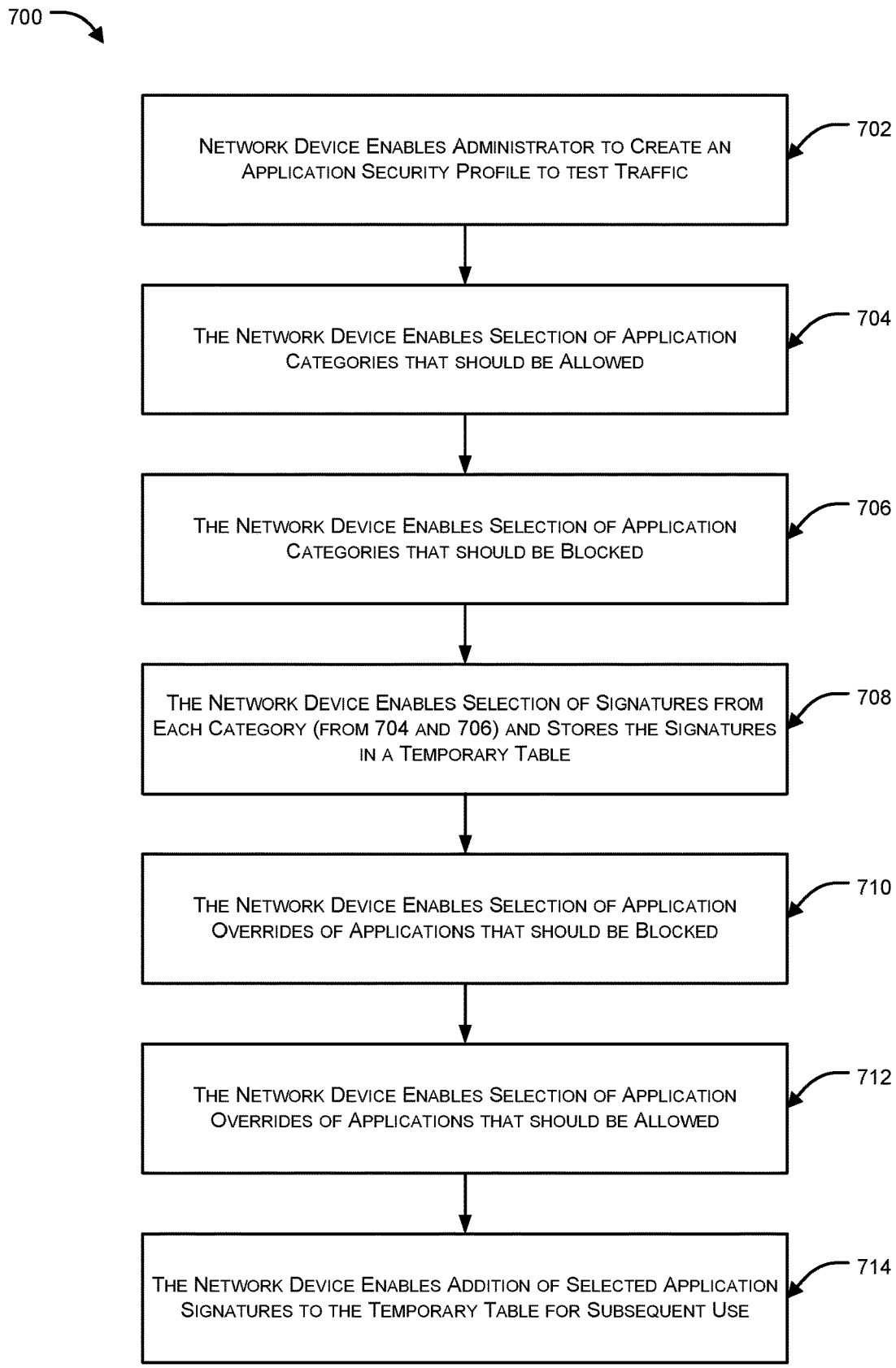
FIGS. 7A-7C illustrate exemplary steps for creating one or more profiles for testing compliance in accordance with embodiments of the present invention.
Figure 7B:
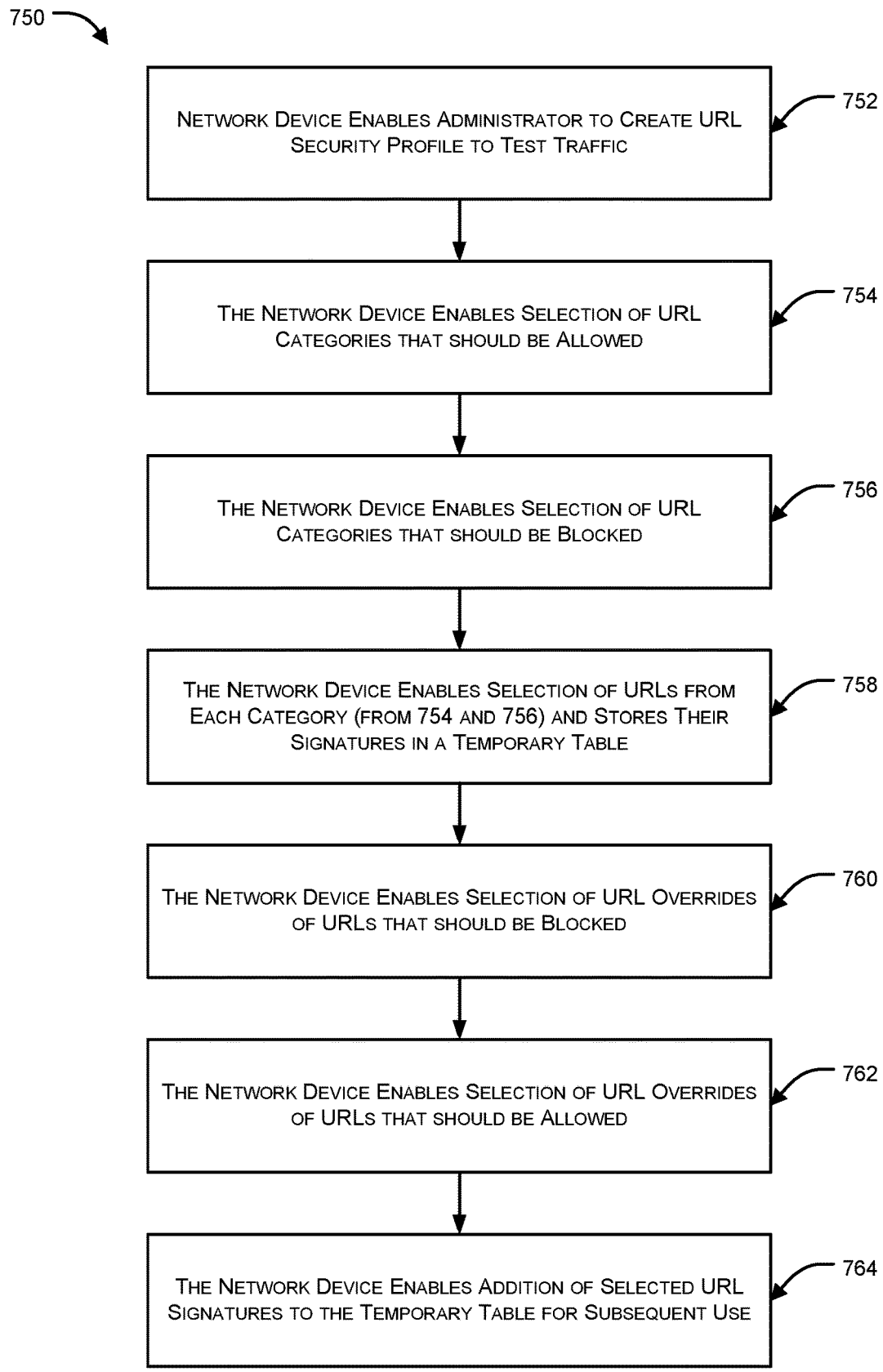
Figure 7C:
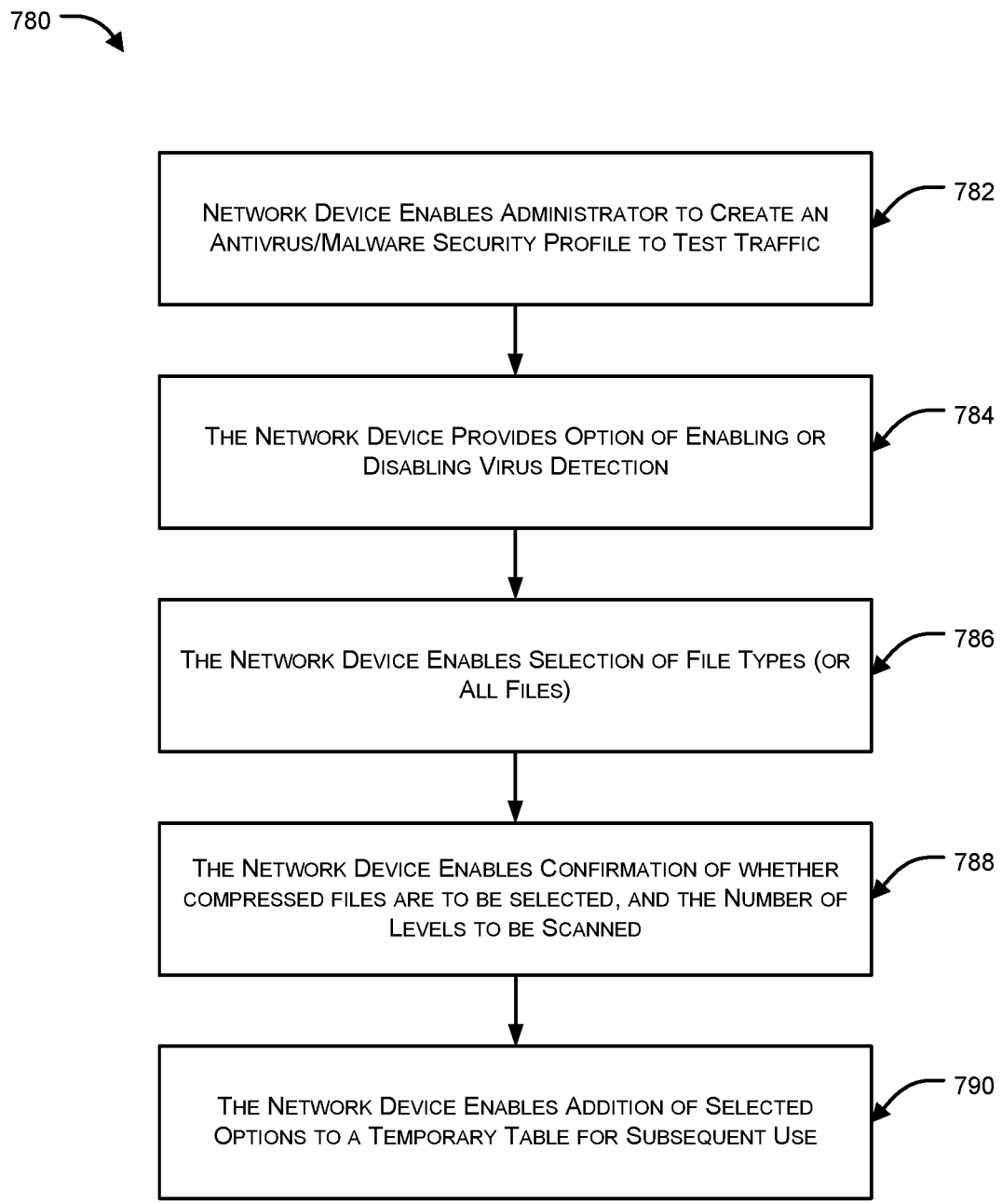

FIGS. 7A-7C illustrate exemplary steps of creating one or more profiles for testing compliance in accordance with embodiments of the present disclosure.

In an aspect, the system of the present disclosure can be configured within a network device that can accordingly perform the steps described further below. Appropriate user interfaces, databases, and Application Programming Interfaces (APIs) can be configured and deployed as required to enable the network device to be accessed by a system administrator to create various security profiles as described hereunder.

FIG. 7A is a flow diagram 700 illustrating how the system of the present disclosure can be configured in a network device for testing of traffic according to an application security profile in accordance with an embodiment of the present invention. In an aspect, at step 702, a network device can enable an administrator to create an application security profile to test traffic, and at step 704, the network device enables selection of application categories that should be allowed. At step 706, the network device can enable selection of application categories that should be blocked, and at step 708, the network device can further enable selection of signatures from each category (as determined from steps 704 and 706 above) so as to store the signatures in a temporary table. At step 710, the network device can enable selection of application overrides of applications that should be blocked, and at step 712, can enable selection of application overrides that should be allowed. At step 712, the network device can enable addition of selected application signatures to the temporary table for subsequent use.

FIG. 7B is a flow diagram 750 illustrating how the system of the present disclosure can be configured in a network device for testing of traffic according to a URL security profile in accordance with an embodiment of the present invention. At step 752, a network device can enable an administrator to create a URL security profile to test traffic, and, at step 754, can enable selection of URL categories that should be allowed. At step 756, the network device can enable selection of URL categories that should be blocked, and at step 758, can enable selection of URLs from each category (as determined from steps 754 and 756 above) so as to store their signatures in a temporary table. At step 760, the network device can enable selection of URL overrides of URLs that should be blocked, and at step 762, can enable selection of URL overrides of URLs that should be allowed. At step 764, the network device can enable addition of selected URL signatures to the temporary table for subsequent use.

FIG. 7C is a flow diagram 780 illustrating how the system of the present disclosure can be configured in a network device for testing of traffic according to an antivirus/malware security profile in accordance with an embodiment of the present invention. In an aspect, at step 782, a network device can enable an administrator to create an antivirus/malware security profile to test traffic, and, at step 784, can provide option of enabling or disabling virus detection. At step 786, the network device can enable selection of file types (or all files), and, at step 788, can enable confirmation of whether compressed files are to be selected, and the number of levels to be scanned. Finally, at step 790, the network device can enable addition of selected options to a temporary table for subsequent use.

Figure 8:
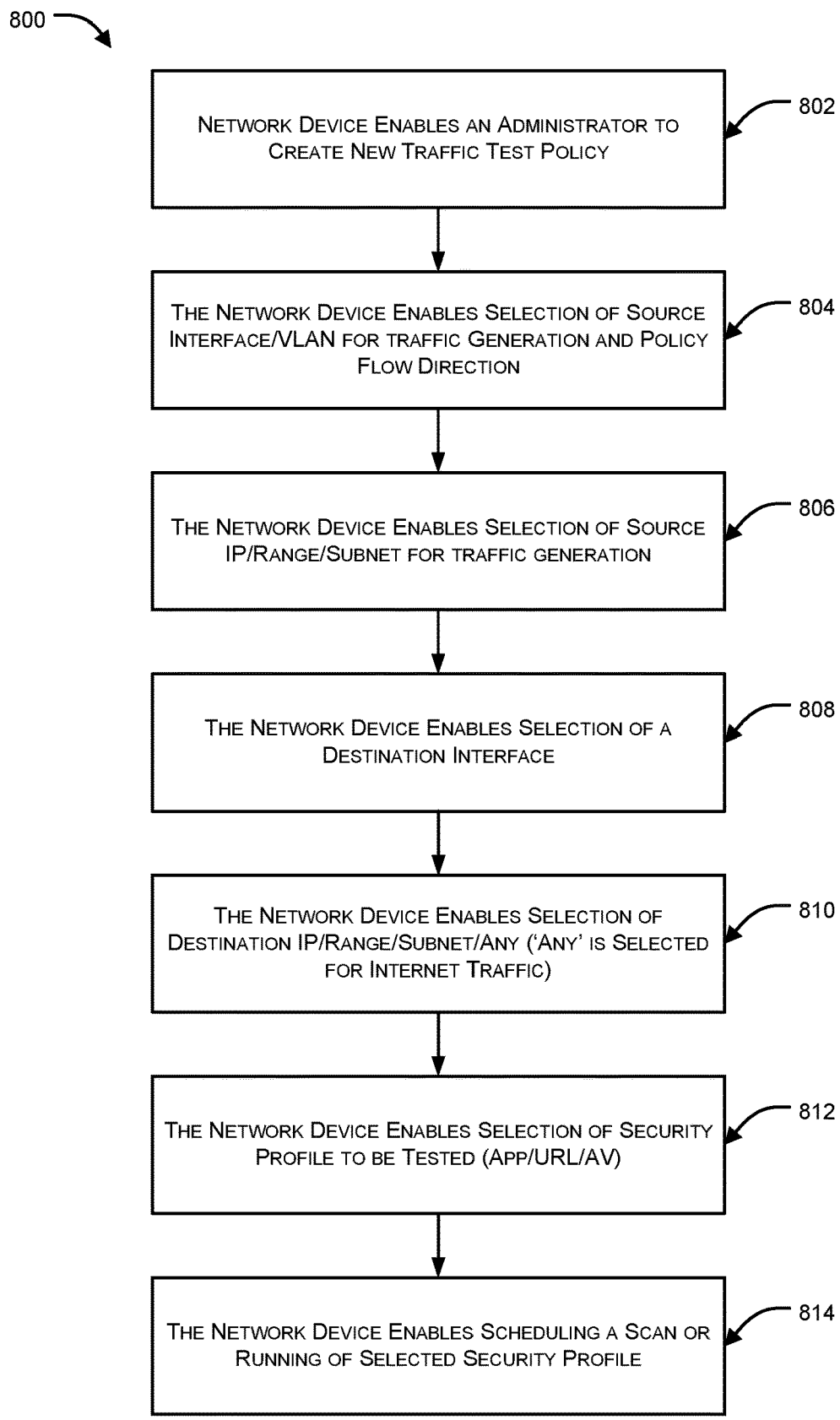
FIG. 8 illustrates exemplary steps for selecting a profile and creating one or more policies for testing the profilein accordance with embodiments of the present invention.

FIG. 8 is a flow diagram 800 illustrating exemplary steps of selecting a profile and creating one or more policies for testing the profile in accordance with embodiments of the present invention. In an aspect, the system of the present disclosure can be configured within a network device and can perform the steps described below. Appropriate user interfaces, databases, and APIs can be configured and deployed as required to enable the network device to be accessed by an administrator to create and test traffic test policy as described above/hereunder. At step 802, network device can enable an administrator to create a new traffic test policy, and, at step 804, can enable selection of source traffic/VLAN for traffic generation and policy flow direction. At step 806, the network device can enable selection of source IP addresses/ranges/subnets for traffic generation, and at step 808, can enable selection of a destination interface. At step 810, the network device can enable selection of destination IP addresses/ranges/subnets/any, for which a destination interface may be used. At step 812, the network device can enable selection of a security profile to be tested, wherein the security profile can include any or a combination of applications to be tested, URLs to be tested, and anti-virus engines (security applications, hardware, software, or a combination thereof) to be tested. At step 814, the network device can enable scheduling a scan or running of selected security profile, wherein the scan can be run at pre-determined times, or at pre-determined events that can either be set by user of the system of the present disclosure or can be automatically configured by the system of the present disclosure. In an exemplary embodiment, the scan can be run at 2 AM each night. In another exemplary embodiment, the scan can be run anytime a virus has been detected to identify immediately weakness/gaps in the protected network before further damage can be caused.

Figure 9:
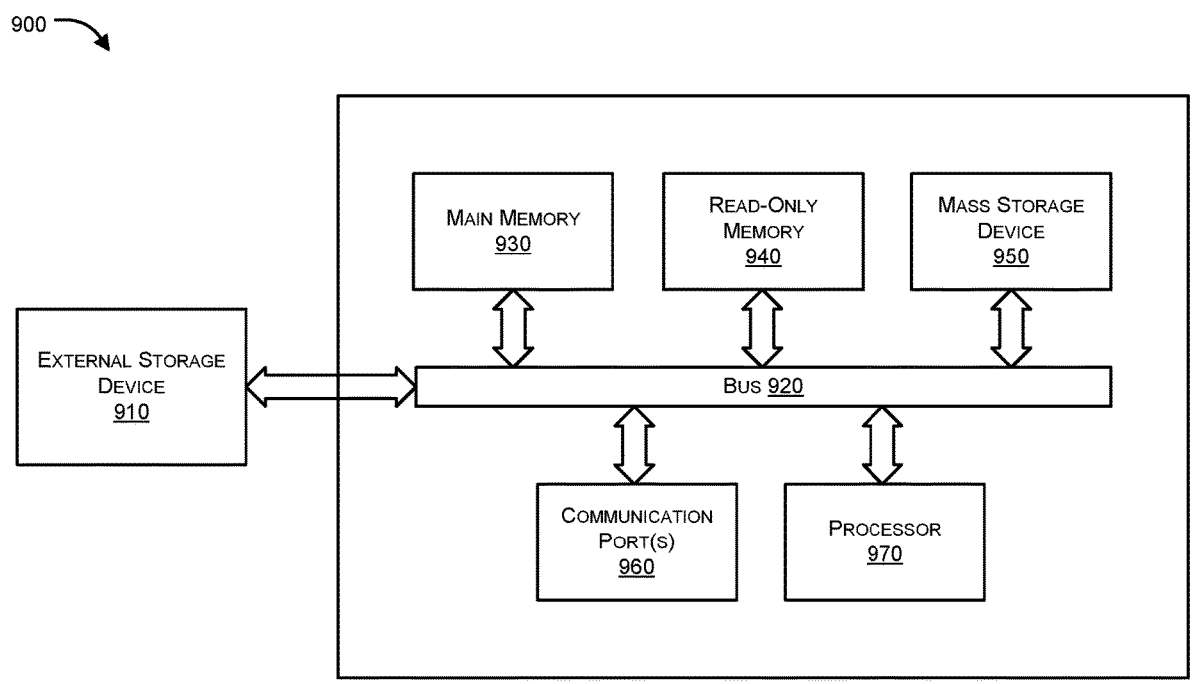
FIG. 9 illustrates an exemplary computer system in which or with which embodiments of the present invention may be utilized.

FIG. 9 illustrates an exemplary computer system in which or with which embodiments of the present invention may be utilized. Computer system may represent all or part of a network device or network security device in which the system of the present disclosure may be implemented.

As shown in the figure, computer system 900 includes an external storage device 910, a bus 920, a main memory 930, a read only memory 940, a mass storage device 950, communication port 960, and a processor 970. Those skilled in the art will that computer system 900 may include more than one processor and more than one communication ports.

Examples of processor 970 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 970 may include various modules associated with embodiments of the system of the present disclosure.

Communication port 960 can be any of an RS-232 port for use with a modem based dialup connection, a 10/100 Ethernet port, a Gigabit or 10/100 Gigabit port using copper or fiber, a serial port, a parallel port, or other existing or future ports. Communication port 960 may be chosen depending on a network, such a Local Area Network (LAN), Wide Area Network (WAN), or any network to which computer system 900 connects.

Memory 930 can be Random Access Memory (RAM), or any other dynamic storage device commonly known in the art. Read only memory 940 can be any static storage device(s) e.g., but not limited to, a Programmable Read Only Memory (PROM) chips for storing static information e.g., start-up or BIOS instructions for processor 970. Mass storage 950 may be any current or future mass storage solution, which can be used to store information and/or instructions.

Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K970), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 920 communicatively couples processor(s) 970 with the other memory, storage and communication blocks. Bus 920 can be, e.g. a Peripheral Component Interconnect (PCI)/ PCI Extended (PCI-X) bus, Small Computer System Interface (SCSI), USB or the like, for connecting expansion cards, drives and other subsystems as well as other buses, such a front side bus (FSB), which connects processor 970 to software system. Optionally, operator and administrative interfaces, e.g. a display, keyboard, and a cursor control device, may also be coupled to bus 920 to support direct operator interaction with computer system 900. Other operator and administrative interfaces can be provided through network connections connected through communication port 960.

External storage device 910 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method comprising:
receiving, by a network device, information regarding a plurality of desired security controls for a protected network, wherein the plurality of desired security controls represent expectations or desires of a network administrator regarding behaviors and responses by the protected network to various types of network traffic scenarios;
generating, by the network device, network traffic configured to validate an extent of conformance by the protected network with the plurality of desired security controls wherein the network traffic includes:
simulated user traffic originated from a plurality of host/user subnets within the protected network;
simulated traffic targeting a plurality of protected subnets within the protected network; and
simulated application traffic;
transmitting, by the network device, the generated network traffic onto the protected network; and
assessing, by the network device, how network security policies configured within the protected network process the generated network traffic.

2. The method of claim 1, wherein the network device comprises a standalone network traffic generator.

3. The method of claim 1, wherein the network device comprises a network security device.

4. The method of claim 1, further comprising based on said assessing, suggesting, by the network device, at least one measure that can be taken within the protected network to improve conformance of the network security policies with the plurality of desired security controls.

5. The method of claim 4, wherein the at least one measure comprises a suggested change to be made to the network security policies.

6. The method of claim 1, further comprising presenting, by the network device, an output indicating how the configured network security policies processed the generated network traffic with respect to the plurality of desired security controls.

7. The method of claim 1, wherein the generated network traffic includes network traffic designed to test proper configuration of network security functions implemented within the protected network, wherein the network security functions include one or more of firewalling, intrusion detection, antivirus scanning, content filtering, Uniform Resource Locator filtering and application control.

8. The method of claim 1, further comprising finding, by the network device, open pathways within the protected network by performing port scanning.

9. The method of claim 1, wherein the desired security controls are indicative of any or a combination of types of packets that should be allowed to pass through the protected network, applications that should be accessible to users of the protected network, categories of websites for which access from host subnets within the protected network should be blocked, internal resources of the protected network that should or should not be accessible by external users, one or more modes of access to one or more servers within the protected network from defined subnets within the protected network, and ports of one or more network devices within the protected network that should be blocked or open.

10. A network device comprising:
a non-transitory storage device having embodied therein one or more routines operable to assess network security policies in place for a protected network; and
one or more processors coupled to the non-transitory storage device and operable to execute the one or more routines, wherein the one or more routines include:
an administrative interface module, which when executed by the one or more processors, receives information indicative of plurality of desired security controls for the protected network, wherein the plurality of desired security controls represent expectations or desires on the part of a network administrator regarding behaviors and responses by the protected network to various types of network traffic scenarios;
a network traffic generation module, which when executed by the one or more processors, generates network traffic configured to validate an extent of conformance by the protected network with the plurality of desired security controls, wherein the generated network traffic includes:
simulated user traffic originated from a plurality of host/user subnets within the protected network;
simulated traffic targeting a plurality of protected subnets within the protected network; and
simulated application traffic;
a network traffic transmission module, which when executed by the one or more processors, transmits the generated network traffic onto the protected network; and
a network security policies assessment module, which when executed by the one or more processors, performs an assessment regarding how the network security policies configured within the protected network process the generated network traffic.

11. The network device of claim 10, wherein the network device comprises a standalone network traffic generator.

12. The network device of claim 10, wherein the network device comprises a network security device.

13. The network device of claim 10, wherein, based on the assessment, the network security policies assessment module further suggests at least one measure that can be taken within the protected network to improve conformance of the network security policies with the plurality of desired security controls.

14. The network device of claim 13, wherein the at least one measure comprises a suggested change to be made to the network security policies.

15. The network device of claim 10, wherein the network security policies assessment module further presents an output indicating how the configured network security policies processed the generated network traffic with respect to the plurality of desired security controls.

16. The network device of claim 10, wherein the generated network traffic includes network traffic designed to test proper configuration of network security functions implemented within the protected network, wherein the network security functions include one or more of firewalling, intrusion detection, antivirus scanning, content filtering, Uniform Resource Locator filtering and application control.

17. The network device of claim 10, wherein the network traffic generation module further finds open pathways within the protected network by performing port scanning.

18. The network device of claim 10, wherein the desired security controls are indicative of any of a combination of types of packets that should be allowed to pass through the protected network, applications that should be accessible to users of the protected network, categories of websites for which access from host subnets within the protected network should be blocked, internal resources of the protected network that should or should not be accessible by external users, one or more modes of access to one or more servers within the protected network from defined subnets within the protected network, and ports of one or more network devices within the protected network that should be blocked or open.

19. The method of claim 6, wherein the output identifies a policy of the network security policies that is misconfigured.

20. The method of claim 19, wherein the misconfigured policy comprises an overly restrictive policy or an overly generous policy relative to the desired security controls.

21. The network device of claim 15, wherein the output identifies a policy of the network security policies that is misconfigured.

22. The network device of claim 21, wherein the misconfigured policy comprises an overly restrictive policy or an overly generous policy relative to the desired security controls.

23. A non-transitory computer readable medium having embodied therein one or more modules comprising:
an administrative interface module, which when executed by one or more processors, receives information indicative of plurality of desired security controls for the protected network, wherein the plurality of desired security controls represent expectations or desires on the part of a network administrator regarding behaviors and responses by the protected network to various types of network traffic scenarios;
a network traffic generation module, which when executed by the one or more processors, generates network traffic configured to validate an extent of conformance by the protected network with the plurality of desired security controls, wherein the generated network traffic includes:
simulated user traffic originated from a plurality of host/user subnets within the protected network;
simulated traffic targeting a plurality of protected subnets within the protected network; and
simulated application traffic;
a network traffic transmission module, which when executed by the one or more processors, transmits the generated network traffic onto the protected network; and
a network security policies assessment module, which when executed by the one or more processors, performs an assessment regarding how the network security policies configured within the protected network process the generated network traffic.

24. The non-transitory computer readable medium of claim 23, wherein, based on the assessment, the network security policies assessment module further suggests at least one measure that can be taken within the protected network to improve conformance of the network security policies with the plurality of desired security controls.

\* \* \* \* \*